(12) United States Patent
Heidari et al.

(10) Patent No.: US 8,192,102 B2
(45) Date of Patent: Jun. 5, 2012

(54) LOAD ABSORPTION SYSTEM

(75) Inventors: Mohammad Ali Heidari, Bellevue, WA (US); Adrian Stanescu, Maple Valley, WA (US); Saba Mahanian, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 116 days.

(21) Appl. No.: 12/323,881

(22) Filed: Nov. 26, 2008

(65) Prior Publication Data

US 2010/0129137 A1    May 27, 2010

(51) Int. Cl.
*F16D 1/033*    (2006.01)

(52) U.S. Cl. .............................. 403/2; 403/408.1; 411/10

(58) Field of Classification Search ........... 403/2, 408.1; 411/9, 10, 38, 456
See application file for complete search history.

(56) References Cited

U.S. PATENT DOCUMENTS

| | | | |
|---|---|---|---|
| 3,174,386 A * | 3/1965 | Lewis | 411/10 |
| 3,198,288 A * | 8/1965 | Presunka | 188/377 |
| 3,493,082 A * | 2/1970 | Bell | 188/377 |
| 3,638,364 A * | 2/1972 | Grove et al. | 451/452 |
| 3,774,896 A | 11/1973 | Rode | |
| 4,212,224 A * | 7/1980 | Bragg et al. | 411/337 |
| 4,254,542 A * | 3/1981 | Craig | 29/464 |
| 4,289,060 A * | 9/1981 | Emmett | 411/34 |
| 4,289,061 A * | 9/1981 | Emmett | 411/34 |
| 4,720,139 A * | 1/1988 | McSmith | 297/216.2 |
| 4,889,457 A * | 12/1989 | Hageman | 411/10 |
| 5,088,866 A * | 2/1992 | Ischebeck et al. | 411/10 |
| 5,316,167 A * | 5/1994 | Kay | 220/328 |
| 5,549,397 A | 8/1996 | Rode | |
| 6,283,639 B1 | 9/2001 | Rode | |
| 6,761,520 B1 * | 7/2004 | Dise | 411/38 |
| 6,793,398 B2 * | 9/2004 | Nahrwold et al. | 384/563 |
| 7,025,560 B2 | 4/2006 | Clark | |
| 7,121,758 B2 | 10/2006 | McMillan et al. | |
| 2003/0194287 A1 | 10/2003 | Hageman | |
| 2009/0311066 A1 * | 12/2009 | Utille | 411/11 |

* cited by examiner

Primary Examiner — Joshua Kennedy
(74) Attorney, Agent, or Firm — Yee & Associates, P.C.

(57) ABSTRACT

An apparatus has a tubular body with a channel and a number of stiffeners. The number of stiffeners allows the tubular body to absorb additional mechanical energy through axial compression. Additionally, the number of stiffeners is located on a number of locations for the tubular body. The apparatus also has a plurality of hinges located in part between the number of locations of the number of stiffeners for the tubular body, and also located between end flanges at the end of the tubular body and a stiffener. The number of hinges further define deformable regions. At least one deformable region of the plurality of deformable regions is configured to expand away from the channel in response to the tubular body being compressed in the axial direction.

15 Claims, 11 Drawing Sheets

LOAD ABSORPTION SYSTEM

BACKGROUND INFORMATION

1. Field

The present disclosure relates generally to an energy absorbing apparatus and, in particular, to a method and apparatus for securing parts to each other. Still more particularly, the present disclosure relates to a method and apparatus for ensuring bolted joints can withstand destructive force levels using a crushable spacer.

2. Background

When manufacturing objects such as engines or generators that could be used in automobiles or aircrafts, spacers may be used when securing parts to each other using fasteners or bolts. For example, when securing an inlet to an engine case, fasteners in the form of bolts and nuts may be used to attach an inlet to the engine case. In designing an engine, the inlet, engine case, and bolts are selected in a manner that may reduce a risk that the inlet may become detached from the engine case if a blade in the engine becomes detached and/or fails during operation of the engine. The inlet should remain intact and attached to the engine case, and the blades should remain contained within the engine case.

Currently, this type of result is achieved through a selection of the number of bolts and the type of bolts in a manner that provides a capability to withstand forces of high magnitudes that may be applied to the inlet if a rapidly rotating fan blade becomes detached from the engine. The selection of bolts and the design of the inlet and engine case to withstand such forces of high magnitude can increase the weight of the aircraft.

This design may result in an increase in the number of bolts and/or the size of the bolts. The design also may increase the thickness and/or size of flanges for the inlet and engine case where the bolts may be used to secure the inlet to the engine case.

It would be desirable to reduce the weight and/or cost of securing an inlet to an engine case. One currently used solution may involve using a load-absorbing element, such as a crushable spacer. A crushable spacer may be used with a bolt and nut assembly to provide a capability to absorb energy that may be applied to the bolt and nut assembly.

Many existing spacer designs, however, are, in general, inefficient in absorbing energy and may not be as effective in minimizing the transmitted force. As a result, although the spacers may absorb energy, the reduction in weight in the design of the inlet and engine case attachment may not be as great as desired.

Therefore, it would be advantageous to have a method and apparatus that overcomes at least one of the issues described above.

SUMMARY

In one advantageous embodiment, an apparatus comprises a tubular body with a channel and a number of stiffeners. The tubular body is capable of being compressed in an axial direction. The number of stiffeners is located on a number of locations for the tubular body.

In another advantageous embodiment, a method is present for installing crushable spacers. Holes for a plurality of parts are aligned to form collinear holes. The crushable spacer is placed on a fastener. The crushable spacer comprises a tubular body with a channel and a number of stiffeners. The tubular body is capable of being compressed in an axial direction, and the number of stiffeners is located on a number of locations for the tubular body. The fastener is placed through the collinear holes for the plurality of parts and is secured.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

DETAILED DESCRIPTION

Figure 1:
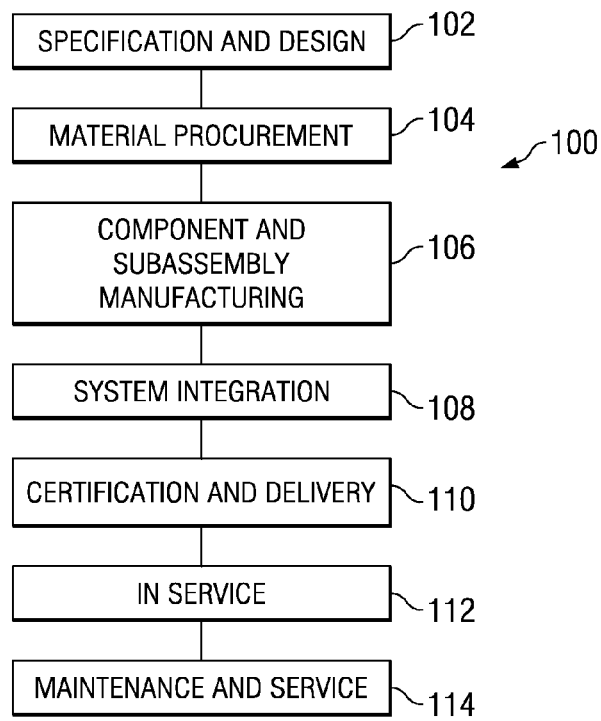
FIG. 1 is a diagram illustrating an aircraft manufacturing and service method in accordance with an advantageous embodiment.
Figure 2:
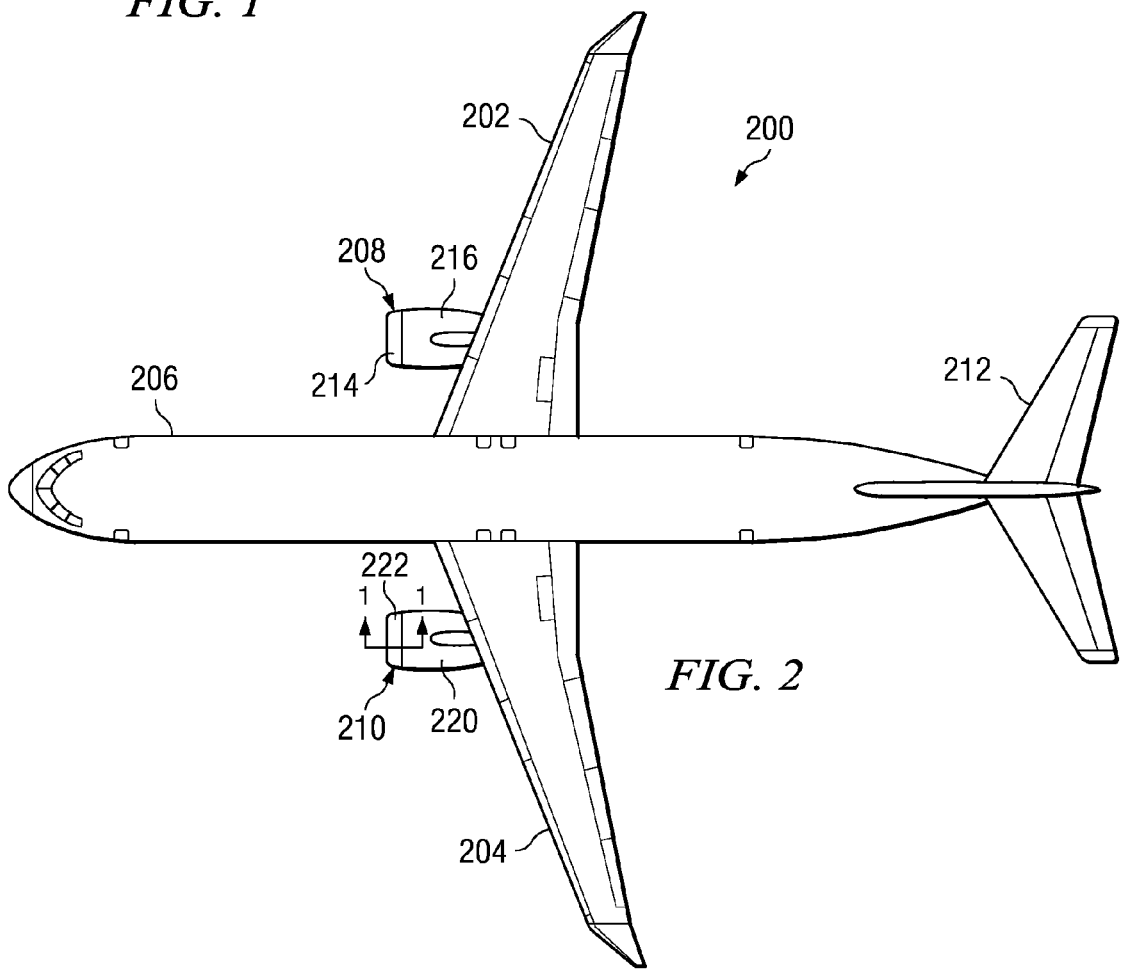
FIG. 2 is a diagram of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, a diagram illustrating an aircraft manufacturing and service method is depicted in accordance with an advantageous embodiment. During pre-production, exemplary aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, a diagram of an aircraft is depicted in which an advantageous embodiment may be implemented. In this example, aircraft 200 is produced by aircraft manufacturing and service method 100 in FIG. 1. As illustrated, aircraft 200 is an example of an aircraft in which crushable spacers may be used with fasteners to attach parts to each other within aircraft 200.

In this illustrative example, aircraft 200 has wings 202 and 204 attached to body 206. Aircraft 200 includes engine 208, engine 210, and tail 212. For example, without limitation, crushable spacers may be used to connect inlet 214 to engine case 216 for engine 208, and to connect inlet 222 to engine case 220 for engine 210. Although an aerospace example is shown, different advantageous embodiments may be applied to other industries, such as the automotive industry.

Apparatus and methods embodied herein may be employed during any one or more of the stages of aircraft manufacturing and service method 100 in FIG. 1. For example, components or subassemblies produced in component and subassembly manufacturing 106 in FIG. 1 may be fabricated or manufactured in a manner similar to components or subassemblies produced while aircraft 200 is in service 112 in FIG. 1.

Also, one or more apparatus embodiments, method embodiments, or a combination thereof may be utilized during production stages, such as component and subassembly manufacturing 106 and system integration 108 in FIG. 1, for example, without limitation, by substantially expediting the assembly of or reducing the cost of aircraft 200. Similarly, one or more of apparatus embodiments, method embodiments, or a combination thereof may be utilized while aircraft 200 is in service 112 or during maintenance and service 114 in FIG. 1.

The different advantageous embodiments recognize and take into account that currently used spacers may not provide as much energy absorption as desired. The different advantageous embodiments recognize that currently used spacers deform with one hinge. In the illustrative examples, a hinge is a location and/or area around which deformation and/or bending may occur. In these examples, the hinge may be a plastic hinge. A plastic hinge is a type of deformation that may occur when a force is applied to a spacer. A plastic hinge involves plastic bending. Plastic bending is a non-linear behavior of a material.

The different advantageous embodiments recognize that the currently used spacers may not provide the desired cost and weight savings that may be desired when attaching parts to each other.

Thus, the different advantageous embodiments provide a method and apparatus for attaching components to each other. In the different advantageous embodiments, a tubular body has a channel in which the tubular body is capable of being compressed in an axial direction. A number of stiffeners are located on a number of locations for the tubular body. This tubular body, with the number of stiffeners, forms a crushable spacer with multiple hinges.

Figure 3:
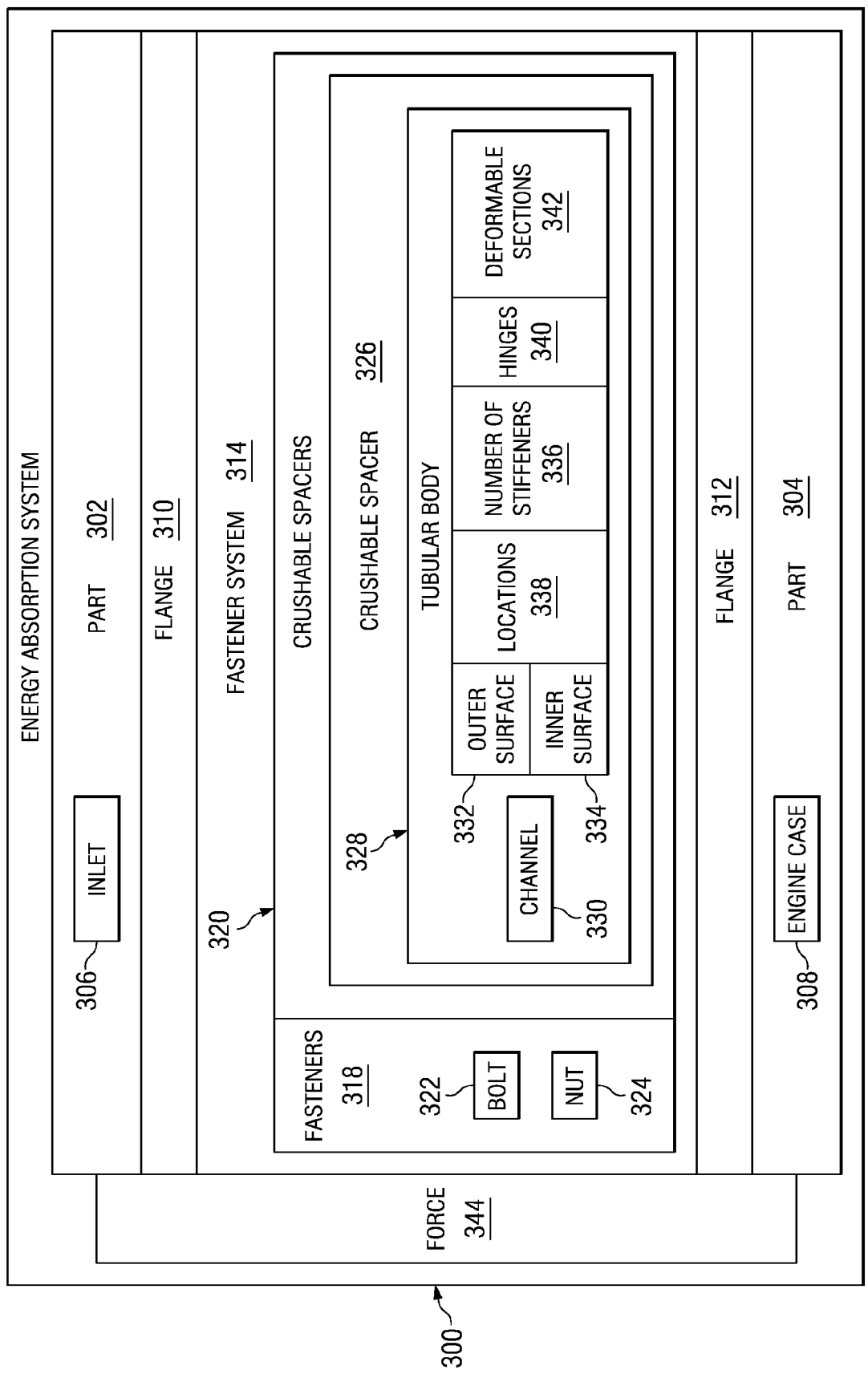
FIG. 3 is a diagram of an energy absorption system in accordance with an advantageous embodiment.

With reference now to FIG. 3, a diagram of an energy absorption system is depicted in accordance with an advantageous embodiment. In this illustrative example, energy absorption system 300 includes part 302 and part 304. Part 302 may be inlet 306, while part 304 may be engine case 308. Of course, part 302 and part 304 may take other forms. Part 302 may be connected to part 304 at flange 310 for part 302 and flange 312 for part 304.

The connection of flange 310 to flange 312 may be performed using fastener system 314. In these examples, fastener system 314 may include fasteners 318 and crushable spacers 320. Bolt 322 is an example of a fastener within fastener system 314. Nut 324 may be used to secure bolt 322. Crushable spacer 326 is an example of a crushable spacer within crushable spacers 320.

Crushable spacer 326 has tubular body 328 with channel 330. Tubular body 328 may have outer surface 332 and inner surface 334. Inner surface 334 may be defined by channel 330. Further, tubular body 328 may be constructed from a variety of materials depending on the particular implementation. Tubular body 328 may be manufactured from materials such as, for example, without limitation, steel, aluminum, titanium, a shape memory alloy, plastic, or some other suitable material. The particular type of material depends on the particular types of parts being connected to each other and the energy absorption that may be desired.

Further, tubular body 328 also has number of stiffeners 336. A number, as used herein, when referring to elements refers to one or more elements. For example, number of stiffeners 336 is one or more stiffeners. A stiffener may be a feature that makes a portion of tubular body 328 stiffer than an adjacent portion of tubular body 328. For example, a stiffener within number of stiffeners 336 may be a portion of tubular body 328 that is thicker than adjacent portions of tubular body 328. In other advantageous embodiments, a stiffener may be a material that is less capable of being deformed as compared to an adjacent portion of tubular body 328.

In these examples, number of stiffeners 336 is located in locations 338 to give rise to hinges 340. In these examples, hinges 340 may be plastic hinges. A plastic hinge may be a state of stress and/or deformation of a bent material that may have exceeded its linear elastic yield and may absorb nonlinear plastic energy.

A deformable section may be located on either side of a stiffener within number of stiffeners 336 in these examples. Number of stiffeners 336 may take various forms. For example, number of stiffeners 336 may comprise at least one of a circular ridge, a helical ridge, or some other feature that changes the thickness of tubular body 328 in a manner that creates a deformable section on either side of a particular stiffener.

As used herein, the phrase "at least one of", when used with a list of items, means that different combinations of one or more of the items may be used and/or only one of each item in the list may be needed. For example, "at least one of item A, item B, and item C" may include, without limitation, item A or item A and item B. This example also may include item A, item B, and item C or item B and item C.

In other examples, "at least one of" may be, for example, without limitation, two of item A, one of item B, and ten of item C; four of item B and seven of item C; and other suitable combinations.

Deformable sections 342 may occur around hinges 340. Crushable spacer 326 has deformable sections 342 defined by hinges 340 as compared to currently used crushable spacers, which only have a single hinge.

In the different advantageous embodiments, number of stiffeners 336 may be designed and/or selected for tubular body 328 in a manner that defines hinges 340. The number of hinges 340 under locations 338 may vary depending on the particular energy absorption desired. With a capability to select two or more hinges for hinges 340, crushable spacer 326 provides greater energy absorption as compared to currently available crushable spacers, which only have a single hinge. When number of stiffeners 336 takes the form of a thicker section for tubular body 328 and/or a structure formed on tubular body 328, number of stiffeners 336 may be located on outer surface 332 and/or inner surface 334.

In this manner, greater energy absorption may be provided by crushable spacers 320 in a manner that reduces and/or prevents fasteners 318 from failing when force 344 is applied to part 302 and part 304.

The illustration of energy absorption system 300 in FIG. 3 is not meant to imply physical or architectural limitations to the manner in which different advantageous embodiments may be implemented. For example, other components may be used in place of, or in addition to, the ones illustrated in energy absorption system 300. For example, in some advantageous embodiments, only a portion of fasteners 318 may employ crushable spacers 320. In yet other advantageous embodiments, more than one crushable spacer may be used with a particular bolt and nut in fastener system 314.

Although the examples illustrate using a crushable spacer with two parts, any number of parts may be present in a structure. Thus, the crushable spacer in the different advantageous embodiments is capable of absorbing an amount of energy caused by a movement of a first part in a plurality of parts to a number of other parts in the plurality of parts in the structure.

Figure 4:
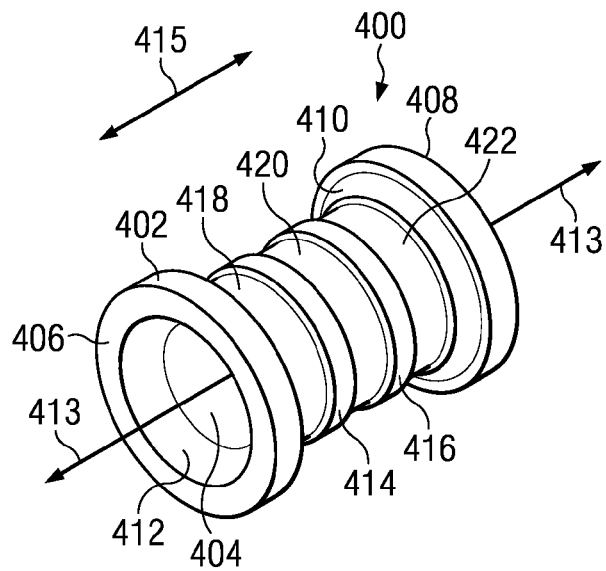
FIG. 4 is a diagram of a crushable spacer in accordance with an advantageous embodiment.

With reference now to FIG. 4, a diagram of a crushable spacer is depicted in accordance with an advantageous embodiment. In this example, a perspective view of crushable spacer 400 is illustrated as one implementation for crushable spacer 326 in FIG. 3. In this illustration, crushable spacer 400 has tubular body 402 with channel 404 extending from end 406 to end 408 of tubular body 402. Tubular body 402 has outer surface 410 and inner surface 412.

In these illustrative examples, tubular body 402 of crushable spacer 400 is capable of being compressed in axial direction 413. Axial direction 413 is a direction parallel to axis 415 running centrally through channel 404 in these examples. The cross-section may have other shapes such as, for example, without limitation, triangular, semicircular, and/or any other suitable shapes.

Additionally, in these illustrative examples, stiffeners 414 and 416 are present on outer surface 410. Hinges 418, 420, and 422 may be present for tubular body 402. Stiffener 414 and stiffener 416 may take the form of circular elements with rectangular cross sections around outer surface 410 of tubular body 402 in these examples.

As another example, in other advantageous embodiments, stiffener 414 and/or stiffener 416 may be located on inner surface 412 rather than outer surface 410. Different numbers of stiffeners may be used to generate different numbers of hinges to create different numbers of deformable sections in these examples.

In the illustrative examples, stiffener 414 and stiffener 416 have a substantially rectangular shape in the cross-sectional view. With stiffeners 414 and 416, three hinges, hinges 418, 420, and 422, are present.

Figure 5:
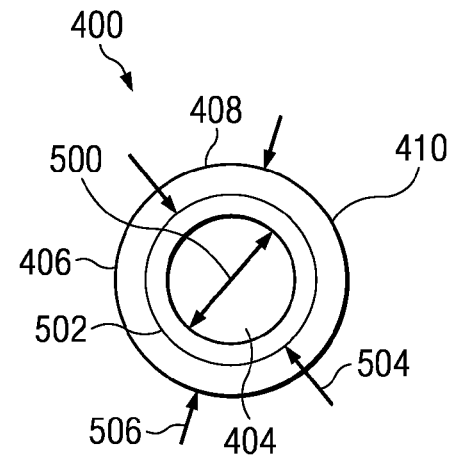
FIG. 5 is an end view of a crushable spacer in accordance with an advantageous embodiment.

With reference now to FIG. 5, an end view of a crushable spacer is depicted in accordance with an advantageous embodiment. In this example, end 406 of tubular body 402 for crushable spacer 400 is depicted. In this illustrative example, channel 404 has diameter 500 and may include tapered section 502 near end 406. Tapered section 502 may have a diameter that changes from diameter 500 to diameter 504. Outer surface 410 of tubular body 402 may have diameter 506 in this example. Diameter 500 may be, for example, around 0.3755 inches; diameter 504 may be around 0.499 inches; and diameter 506 may be around 0.0640 inches.

Figure 6:
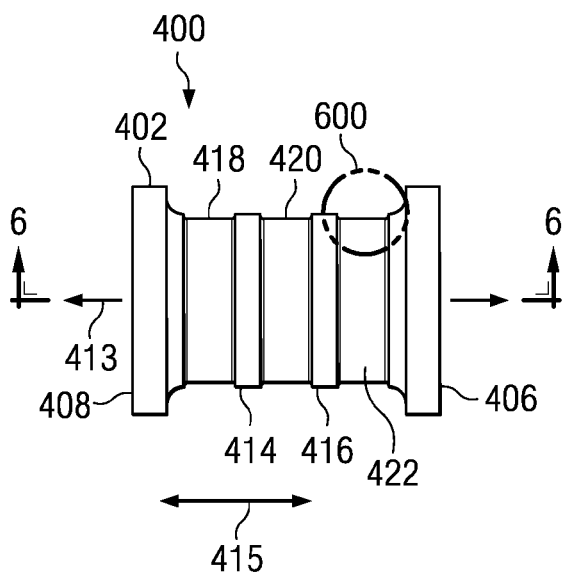
FIG. 6 is a side view of a crushable spacer in accordance with an advantageous embodiment.

In FIG. 6, a side view of crushable spacer 400 is depicted in accordance with an advantageous embodiment. In this view, a more detailed illustration of section 600 of outer surface 410 of tubular body 402 may be seen with reference to FIG. 7.

Figure 7:
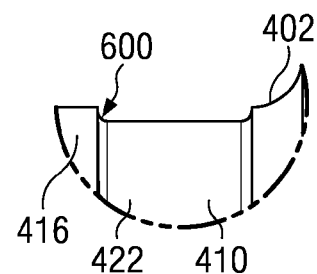
FIG. 7 is a more detailed view of a portion of an outer surface of a tubular body in accordance with an advantageous embodiment.

With reference now to FIG. 7, a more detailed view of a portion of an outer surface of a tubular body is depicted in accordance with an advantageous embodiment. Section 600 is illustrated in more detail. Stiffener 416 in deformable section 422 may be seen in this illustrative example.

Figure 8:
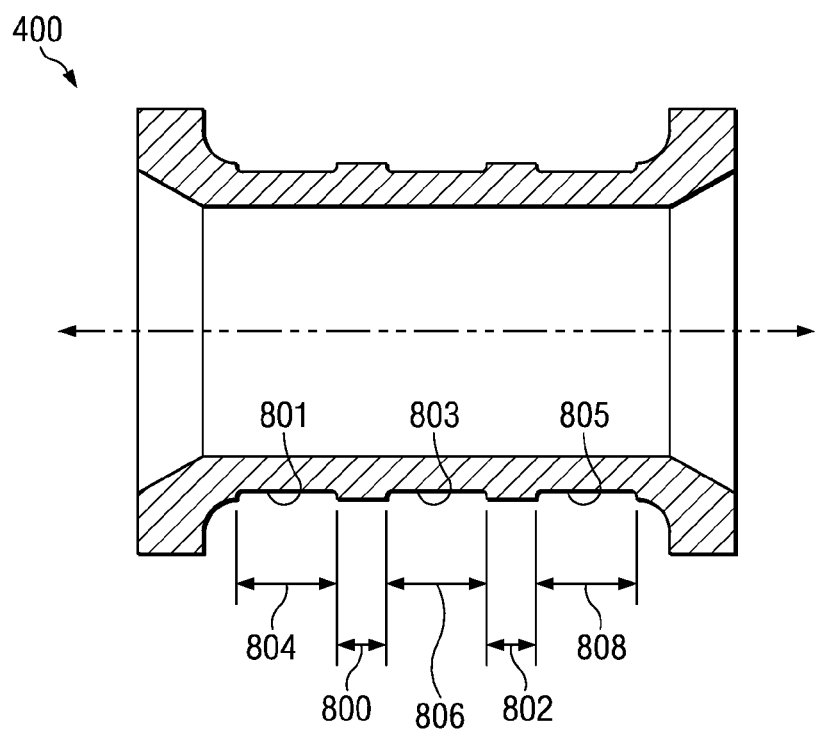
FIG. 8 is a cross-sectional view of a crushable spacer in accordance with an advantageous embodiment.

With reference now to FIG. 8, a cross-sectional view of a crushable spacer is depicted in accordance with an advantageous embodiment. In this example, crushable spacer 400 may be seen from a cross section taken along lines 6-6 in FIG. 6. In this example, stiffener 414 may have width 800, and stiffener 416 may have width 802. Width 800 and width 802 may be around 0.0750 inches in these examples. Section 801 has width 804, section 803 has width 806, and section 805 has width 808. Sections 801, 803, and 805 may be substantially flat in this cross-sectional side view. Width 804, width 806, and width 808 may have a value of around 0.150 inches. The dimensions may vary depending on the particular implementation.

The illustration of crushable spacer 400 in FIGS. 4-8 is provided as one example implementation of crushable spacer 326 in FIG. 3. In other advantageous embodiments, crushable spacer 400 may have different numbers of stiffeners and/or other dimensions for various components. Further, the stiffeners also may take a different shape or form other than a circular element with a rectangular cross-section in these examples.

Figure 9:
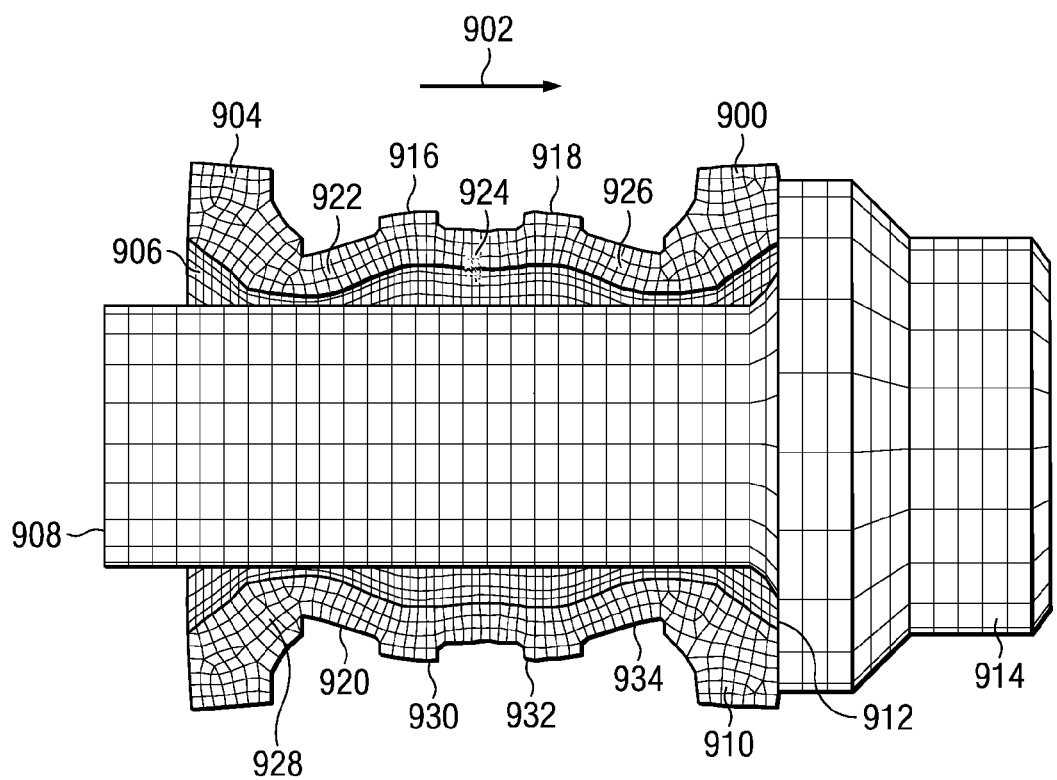
FIG. 9 is a diagram illustrating a compressed crushable spacer in accordance with an advantageous embodiment.

With reference now to FIG. 9, a diagram illustrating a compressed crushable spacer is depicted in accordance with an advantageous embodiment. Crushable spacer 900 may be an example of one implementation for crushable spacer 326 in FIG. 3. In this illustrative example, crushable spacer 900 is an example of crushable spacer 400 that has been compressed in axial direction 902.

In this example, crushable spacer 900 has tubular body 904 with channel 906 through which bolt 908 has been placed. In this example, end 910 of tubular body 904 may be forced against surface 912 of head 914 of bolt 908. In these examples, stiffeners 916 and 918 on surface 920 of tubular body 904 result in hinges 922, 924, and 926 as illustrated. These hinges may also be referred to as plastic hinges. Stiffeners 916 and 918 provide guidance for plastic deformation in regions 928, 930, 932, and 934 around hinges 922, 924, and 926. With these hinges, additional energy may be absorbed by tubular body 904 as compared to deformation of a tubular body without stiffeners.

Figure 10:
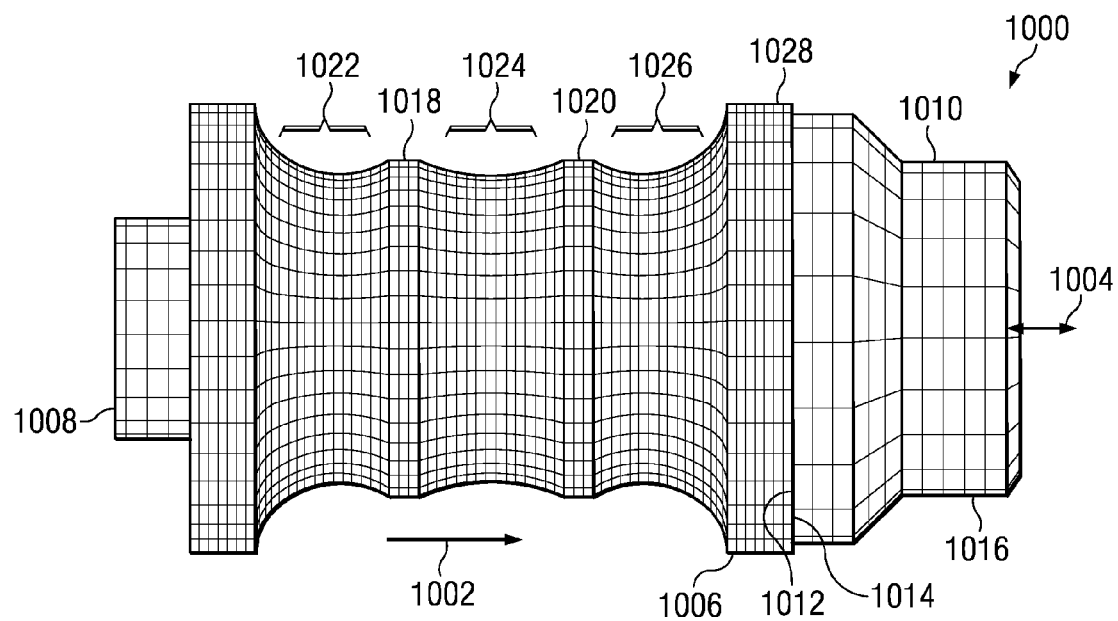
FIG. 10 is a diagram illustrating a crushable spacer in accordance with an advantageous embodiment.

With reference now to FIG. 10, a diagram illustrating a crushable spacer is depicted in accordance with an advantageous embodiment. Crushable spacer 1000 is an example implementation of crushable spacer 326 in FIG. 3.

In this example, crushable spacer 1000 may be compressed in axial direction 1002, which may be located along or parallel to axis 1004. Tubular body 1006 has channel 1008 through which bolt 1010 is located. End 1012 of crushable spacer 1000 may contact surface 1014 of head 1016 of bolt 1010. In this example, stiffeners 1018 and 1020 are present. Stiffeners 1018 and 1020 have a curved shape in contrast to the rectangular shape for stiffeners 916 and 918 in crushable spacer 900. Further, regions 1022, 1024, and 1026 of surface 1028 also may be curved in contrast to a substantially flat surface.

Figure 11:
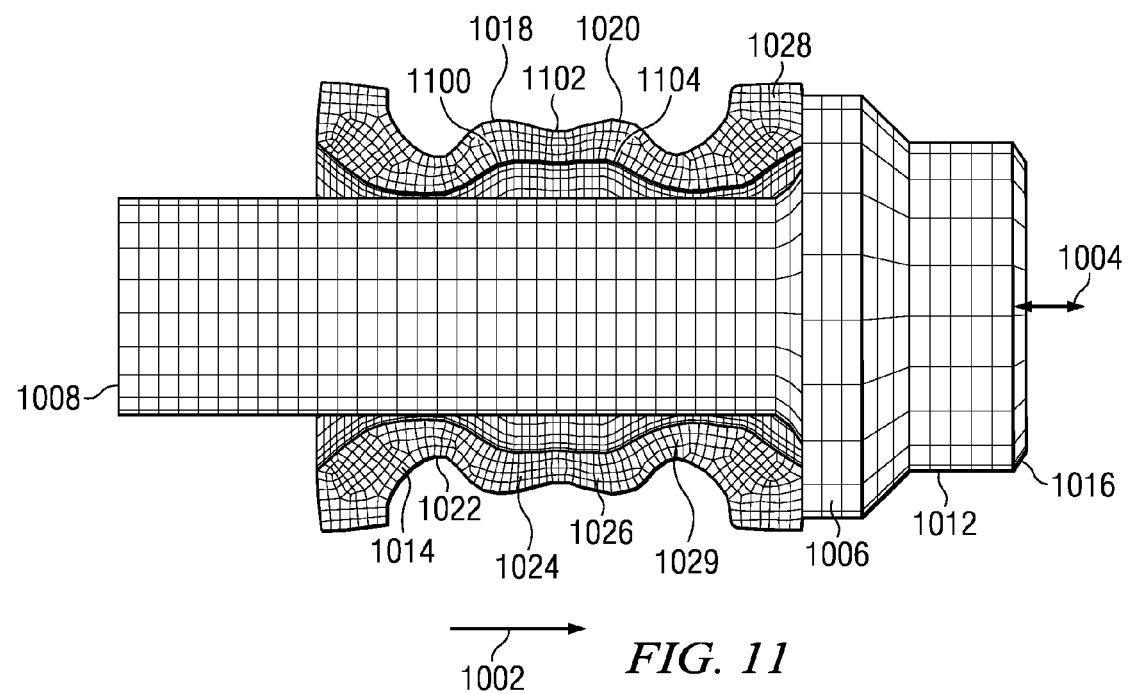
FIG. 11 is a diagram illustrating a compressed crushable spacer in accordance with an advantageous embodiment.

With reference now to FIG. 11, a diagram illustrating a compressed crushable spacer is depicted in accordance with an advantageous embodiment. In this example, crushable spacer 1000 has been compressed in axial direction 1004. As can be seen in this example, hinges 1100, 1102, and 1104 are present. These hinges are locations about which deformations occur in deformable regions 1022, 1024, 1026, and 1029.

Figure 12:
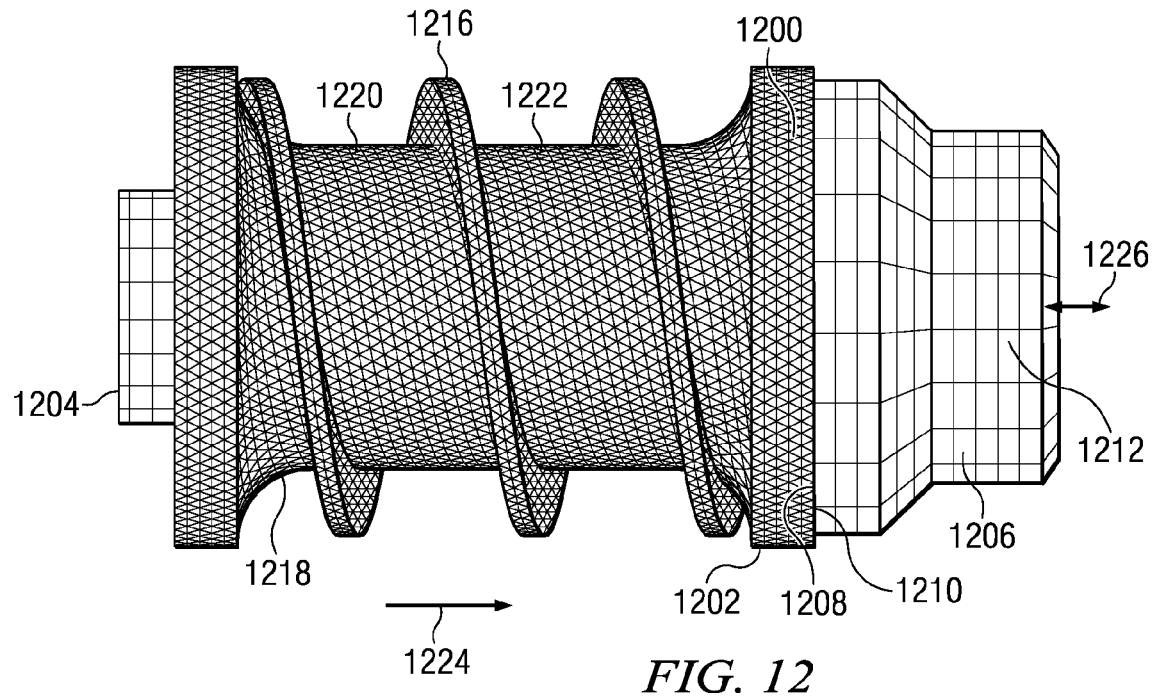
FIG. 12 is a diagram of a crushable spacer in accordance with an advantageous embodiment.

With reference now to FIG. 12, a diagram of a crushable spacer is depicted in accordance with an advantageous embodiment. Crushable spacer 1200 is an example of one implementation of crushable spacer 326 in FIG. 3.

In this example, crushable spacer 1200 has tubular body 1202 with channel 1204 through which bolt 1206 may be placed. End 1208 of tubular body 1202 may contact surface 1210 of head 1212 of bolt 1206.

Stiffener 1216 is present on surface 1218 of tubular body 1202. Stiffener 1216 has a helical shape in this example. In this example, stiffener 1216 may have hinges 1220 and 1222 when crushable spacer 1200 is compressed in axial direction 1224, which may be parallel or aligned with axis 1226.

Figure 13:
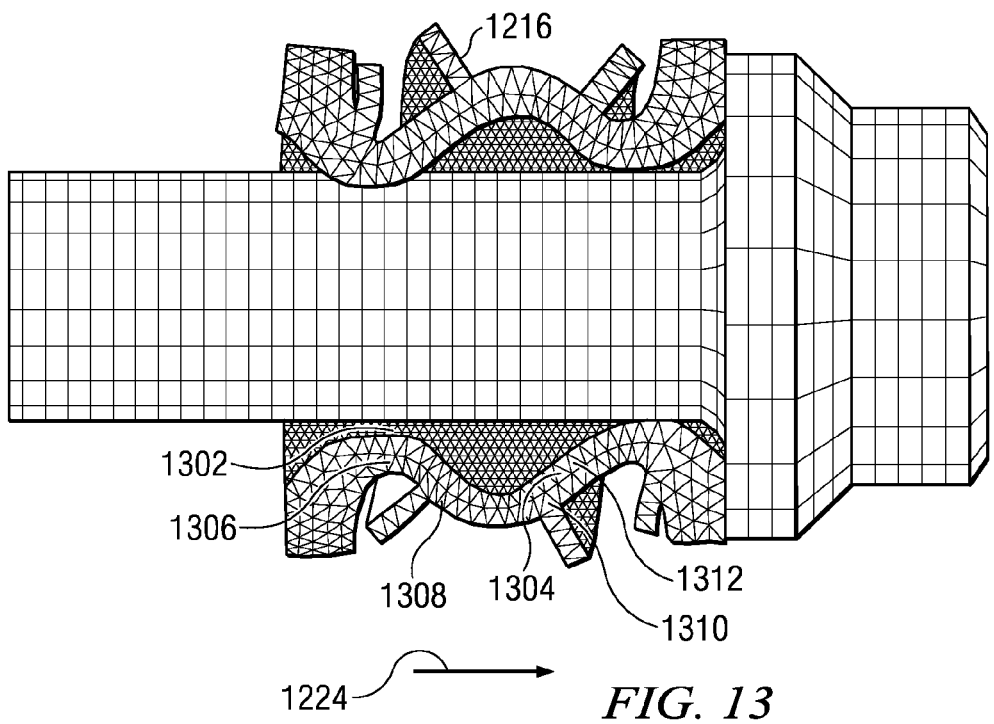
FIG. 13 is a diagram of a compressed spacer in accordance with an advantageous embodiment.

With reference now to FIG. 13, a diagram of a compressed crushable spacer is depicted in accordance with an advantageous embodiment. In this example, crushable spacer 1200 has been compressed in axial direction 1224. Stiffener 1216, in this example, results in hinges 1302 and 1304, as seen in this cross-sectional view of crushable spacer 1200. Deformable regions 1306, 1308, 1310, and 1312 are deformed around these hinges.

The illustration of crushable spacers in FIGS. 4-13 have been provided for purposes of illustrating some implementations of crushable spacer 326 in FIG. 3. Other advantageous embodiments may use other parameters for stiffeners. For example, in other advantageous embodiments, other numbers of stiffeners, other shapes for stiffeners, other locations for stiffeners, and other suitable parameters regarding stiffeners may be implemented. The selected parameters for stiffeners may depend on the amount of energy that a particular crushable spacer should absorb.

In this manner, crushable spacers, in accordance with advantageous embodiments, may absorb greater amounts of energy as compared to currently available spacers. Further, the crushable spacers in the different advantageous embodiments absorb energy that may otherwise be transferred to a bolt associated with the crushable spacer. With the use of crushable spacers, the force applied to a bolt may be reduced.

Figure 14:
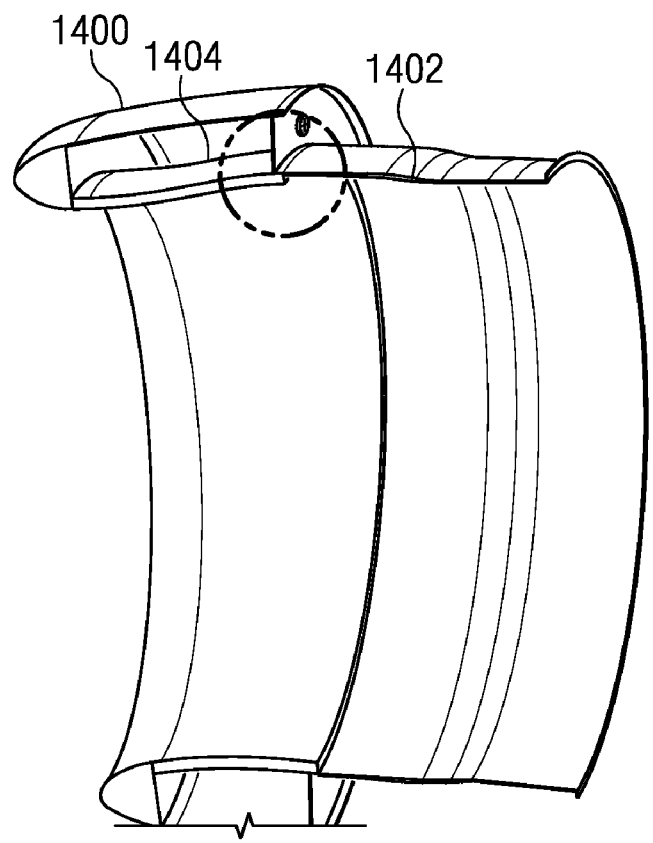
FIG. 14 is a cross-sectional view of a portion of an engine in accordance with an advantageous embodiment.

With reference now to FIG. 14, a cross-sectional view of a portion of an engine is depicted in accordance with an advantageous embodiment. In this example, a cross-sectional view of a portion of an engine such as, for example, engine 210 in FIG. 2 is depicted in accordance with an advantageous embodiment.

In this example, inlet 1400 and fan case 1402 are examples of a portion of engine 210 taken along lines 1-1. Inlet 1400 is attached to fan case 1402 using fasteners and crushable spacers in the different advantageous embodiments. The fasteners and crushable spacers may be used in sections, such as section 1404.

Figure 15:
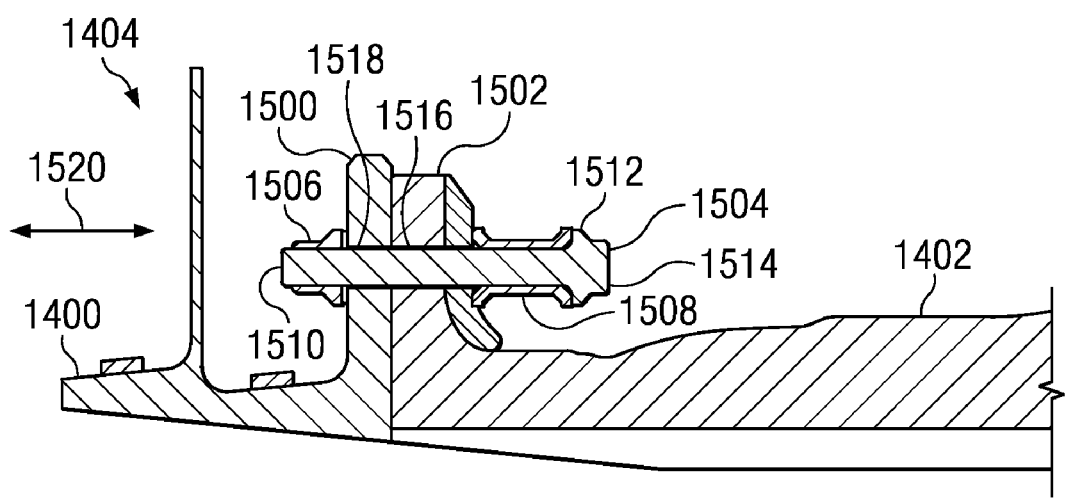
FIG. 15 is a detailed cross-sectional view of an attachment region between an inlet and a fan case in accordance with an advantageous embodiment.

With reference now to FIG. 15, a detailed cross-sectional view of an attachment region between an inlet and a fan case is depicted in accordance with an advantageous embodiment. In this example, a more detailed view of section 1404 is depicted in accordance with an advantageous embodiment. Flange 1500 of inlet 1400 is attached to flange 1502 of fan case 1402. This attachment is made using bolt 1504, nut 1506, and crushable spacer 1508. Bolt 1504 has end 1510 and end 1512.

End 1512 forms head 1514 for bolt 1504. Bolt 1504 is placed through crushable spacer 1508. Crushable spacer 1508 is located around head 1514 of bolt 1504. Bolt 1504 is then placed through hole 1516 of flange 1502 and hole 1518 of flange 1500. Nut 1506 is then secured to end 1510 of bolt 1504.

With the use of crushable spacer 1508, the amount of force applied to bolt 1504 may be reduced if force is applied to inlet 1400 and/or fan case 1402 in a manner to separate these parts from each other. Crushable spacer 1508 may deform axially to allow for some movement of inlet 1400 and/or fan case 1402 in the direction of arrow 1520.

The deformation of crushable spacer 1508 may reduce the amount of force and/or energy applied to bolt 1504. In this manner, bolt 1504 may endure higher levels of force and/or energy that may be applied to inlet 1400 and/or fan case 1402 than otherwise would be possible without crushable spacer 1508. In other words, crushable spacer 1508 performs an energy absorption function.

As a result, in designing inlet 1400 and fan case 1402 and selecting bolt 1504 and nut 1506, decreases in weight and/or expense may be made through taking into account the energy absorption that may be provided by crushable spacer 1508. Further, nut 1506 may be tightened with respect to bolt 1504 to preload force on bolt 1504.

Figure 16:
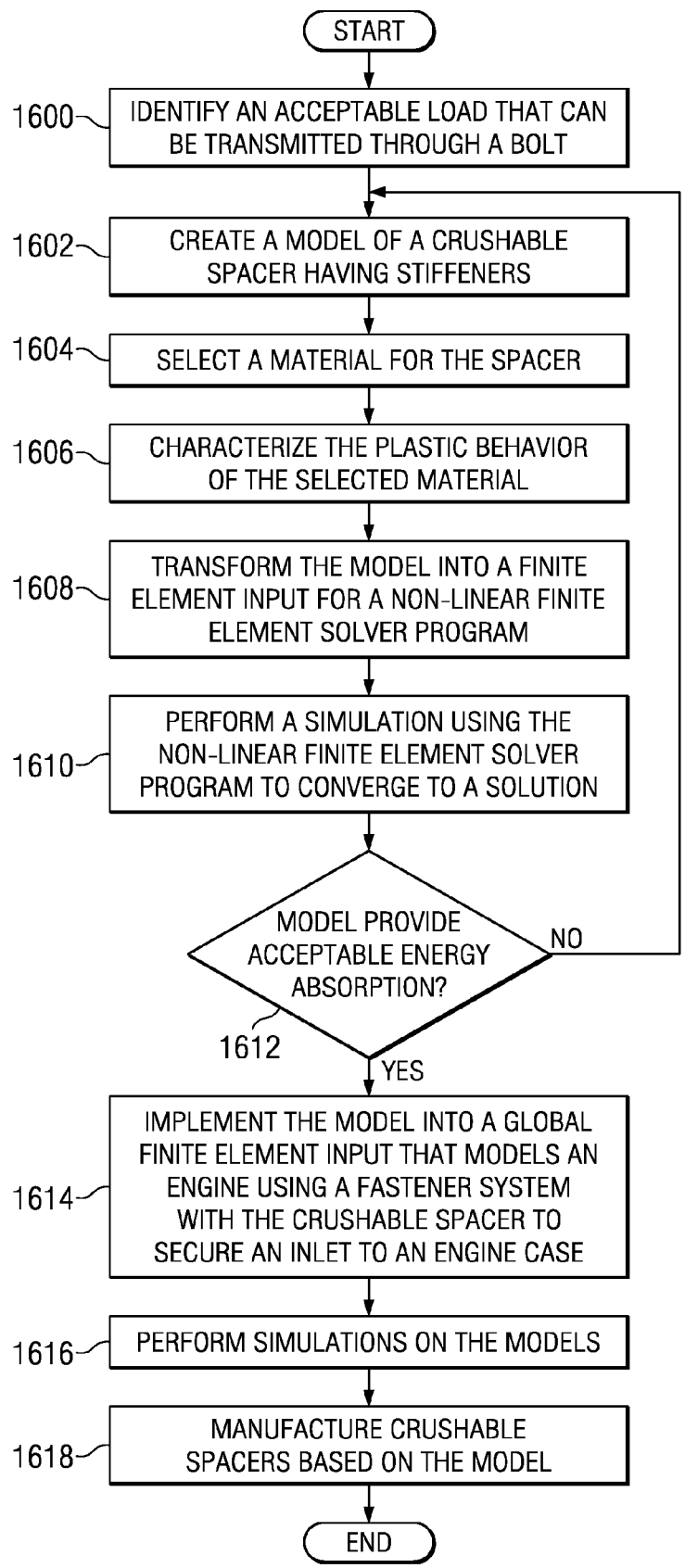
FIG. 16 is a flowchart of a process for designing a crushable spacer in accordance with an advantageous embodiment.

With reference now to FIG. 16, a flowchart of a process for designing a crushable spacer is depicted in accordance with an advantageous embodiment. The process illustrated in FIG. 16 may be used to design a crushable spacer such as, for example, crushable spacer 326 in FIG. 3.

The process begins by identifying an acceptable load that can be transmitted through a bolt (operation 1600). The process then creates a model of a crushable spacer having stiffeners (operation 1602). In operation 1602, various design constraints are included in the model of the crushable spacer. These design constraints include, for example, space, dimensions, torque preload values, and other suitable information.

A material is selected for the spacer (operation 1604). The process then characterizes the plastic behavior of the selected material (operation 1606). This characterization may be performed through various engineering tests on the material or from available information about the material. The process then transforms the model into a finite element input for a non-linear finite element solver program (operation 1608).

The non-linear finite element solver program may be implemented using any available non-linear finite element solver program. Examples of programs that may be used include, for example, without limitation, LS-DYNA, ABAQUS, and NASTRAN SOL 600. The program may perform simulations of large displacement and plasticity. The process then performs a simulation using the non-linear finite element solver program to converge to a solution (operation 1610).

A determination is then made as to whether the model provides acceptable energy absorption (operation 1612). The determination in operation 1612 may be made in a number of different ways. For example, the results of the simulation may be compared to a baseline spacer, which has no stiffeners. In other advantageous embodiments, the determination may be made based on whether the results from the simulation of the model provide energy absorption that meets some desired level of energy absorption. If the model is not acceptable, the process returns to operation 1602.

If the model is acceptable, the process then implements the model into a global finite element input that models an engine using a fastener system with the crushable spacer to secure an inlet to an engine case (operation 1614). The process then performs simulations on the models (operation 1616). Crushable spacers are manufactured based on the model (operation 1618), with the process terminating thereafter.

Figure 17:
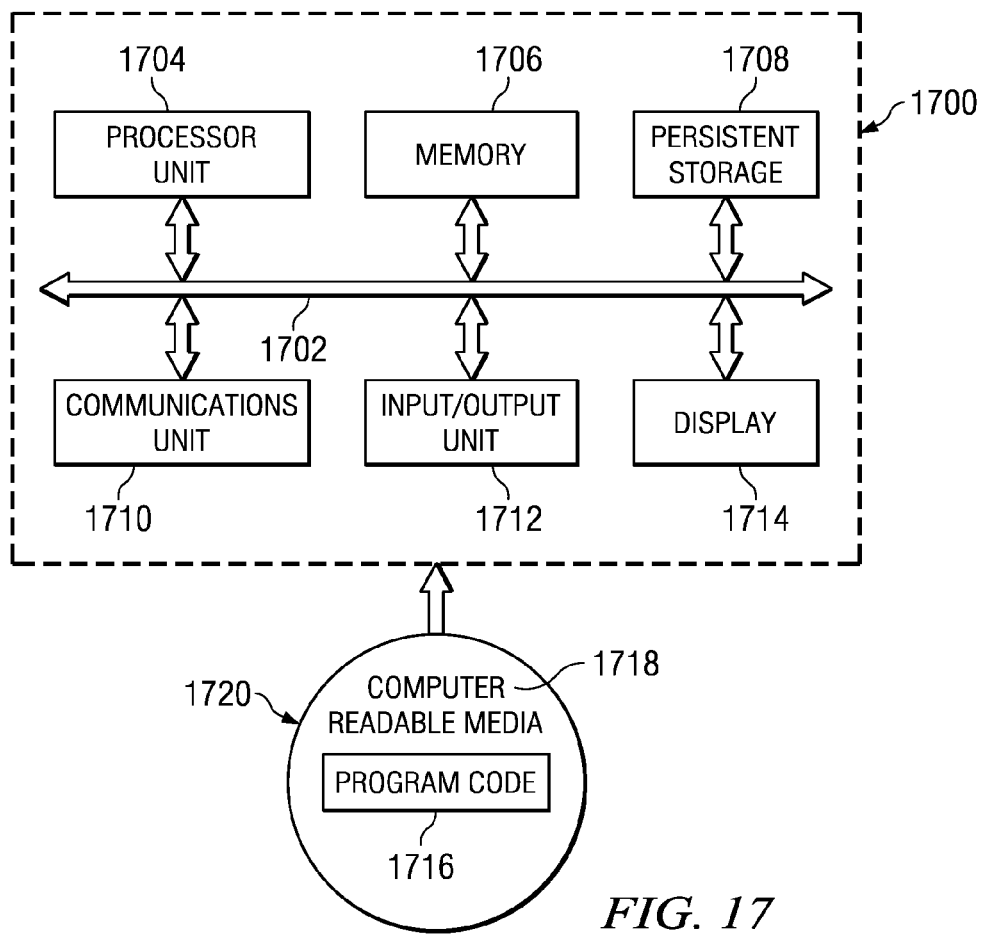
FIG. 17 is a diagram of a data processing system in accordance with an illustrative embodiment.

Turning now to FIG. 17, a diagram of a data processing system is depicted in accordance with an advantageous embodiment. Data processing system 1700 is an example of a data processing system that may be used to design a crushable spacer. Data processing system 1700 may be used to implement one or more operations from the process in FIG. 16.

In this illustrative example, data processing system 1700 includes communications fabric 1702, which provides communications between processor unit 1704, memory 1706, persistent storage 1708, communications unit 1710, input/output (I/O) unit 1712, and display 1714.

Processor unit 1704 serves to execute instructions for software that may be loaded into memory 1706. Processor unit 1704 may be a set of one or more processors or may be a multi-processor core, depending on the particular implementation. Further, processor unit 1704 may be implemented using one or more heterogeneous processor systems in which a main processor is present with secondary processors on a single chip. As another illustrative example, processor unit 1704 may be a symmetric multi-processor system containing multiple processors of the same type.

Memory 1706 and persistent storage 1708 are examples of storage devices. A storage device is any piece of hardware that is capable of storing information either on a temporary basis and/or a permanent basis. Memory 1706, in these examples, may be, for example, a random access memory or any other suitable volatile or non-volatile storage device. Persistent storage 1708 may take various forms depending on the particular implementation.

For example, persistent storage 1708 may contain one or more components or devices. For example, persistent storage 1708 may be a hard drive, a flash memory, a rewritable optical disk, a rewritable magnetic tape, or some combination of the above. The media used by persistent storage 1708 also may be removable. For example, a removable hard drive may be used for persistent storage 1708.

Communications unit 1710, in these examples, provides for communications with other data processing systems or devices. In these examples, communications unit 1710 is a network interface card. Communications unit 1710 may provide communications through the use of either or both physical and wireless communications links.

Input/output unit 1712 allows for input and output of data with other devices that may be connected to data processing system 1700. For example, input/output unit 1712 may provide a connection for user input through a keyboard and mouse. Further, input/output unit 1712 may send output to a printer. Display 1714 provides a mechanism to display information to a user.

Instructions for the operating system and applications or programs are located on persistent storage 1708. These instructions may be loaded into memory 1706 for execution by processor unit 1704. The processes of the different embodiments may be performed by processor unit 1704 using computer implemented instructions, which may be located in a memory, such as memory 1706. These instructions are referred to as program code, computer usable program code, or computer readable program code that may be read and executed by a processor in processor unit 1704. The program code in the different embodiments may be embodied on different physical or tangible computer readable media, such as memory 1706 or persistent storage 1708.

Program code 1716 is located in a functional form on computer readable media 1718 that is selectively removable and may be loaded onto or transferred to data processing system 1700 for execution by processor unit 1704. Program code 1716 and computer readable media 1718 form computer program product 1720 in these examples. In one example, computer readable media 1718 may be in a tangible form such as, for example, an optical or magnetic disc that is inserted or placed into a drive or other device that is part of persistent storage 1708 for transfer onto a storage device, such as a hard drive that is part of persistent storage 1708.

In a tangible form, computer readable media 1718 also may take the form of a persistent storage, such as a hard drive, a thumb drive, or a flash memory that is connected to data processing system 1700. The tangible form of computer readable media 1718 is also referred to as computer recordable storage media. In some instances, computer readable media 1718 may not be removable.

Alternatively, program code 1716 may be transferred to data processing system 1700 from computer readable media 1718 through a communications link to communications unit 1710 and/or through a connection to input/output unit 1712. The communications link and/or the connection may be physical or wireless in the illustrative examples. The computer readable media also may take the form of non-tangible media, such as communications links or wireless transmissions containing the program code.

In some illustrative embodiments, program code 1716 may be downloaded over a network to persistent storage 1708 from another device or data processing system for use within data processing system 1700. For instance, program code stored in a computer readable storage medium in a server data processing system may be downloaded over a network from the server to data processing system 1700. The data processing system providing program code 1716 may be a server computer, a client computer, or some other device capable of storing and transmitting program code 1716.

The different components illustrated for data processing system 1700 are not meant to provide architectural limitations to the manner in which different embodiments may be implemented. The different illustrative embodiments may be implemented in a data processing system including components in addition to, or in place of, those illustrated for data processing system 1700. Other components shown in FIG. 17 can be varied from the illustrative examples shown.

The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

Figure 18:
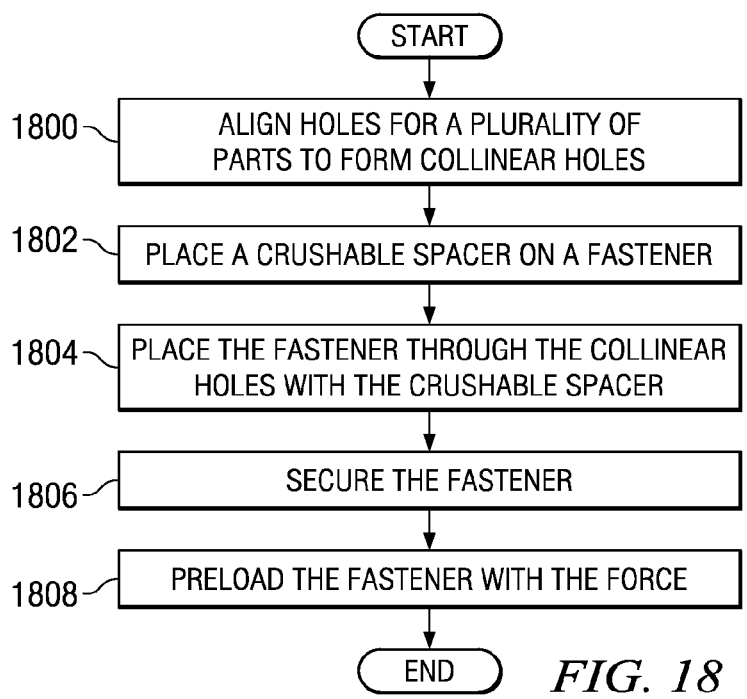
FIG. 18 is a flowchart of a process for installing a crushable spacer in accordance with an advantageous embodiment.

With reference now to FIG. 18, a flowchart of a process for installing a crushable spacer is depicted in accordance with an advantageous embodiment. The process illustrated in FIG. 18 may be implemented to attach parts to each other in an object to form an energy absorption system such as, for example, energy absorption system 300 in FIG. 3.

The process begins by aligning holes for a plurality of parts to form collinear holes (operation 1800). The process places a crushable spacer on a fastener (operation 1802). In these examples, a crushable spacer has a tubular body with a channel. The tubular body is capable of being compressed in an axial direction. A number of stiffeners is located on a number of locations for the tubular body. The process then places the fastener through the collinear holes with the crushable spacer (operation 1804).

The fastener is secured (operation 1806). In these examples, the fastener may be a bolt, which may be secured by a nut placed on the other end of the fastener. The process preloads the fastener with the force (operation 1808), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions. In some embodiments, one or more operations also may be implemented by a human operator.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. In some embodiments, one or more operations may be optional, and other operations also may be included that are not shown. For example, operation 1808 may be omitted in some advantageous embodiments.

Figure 19:
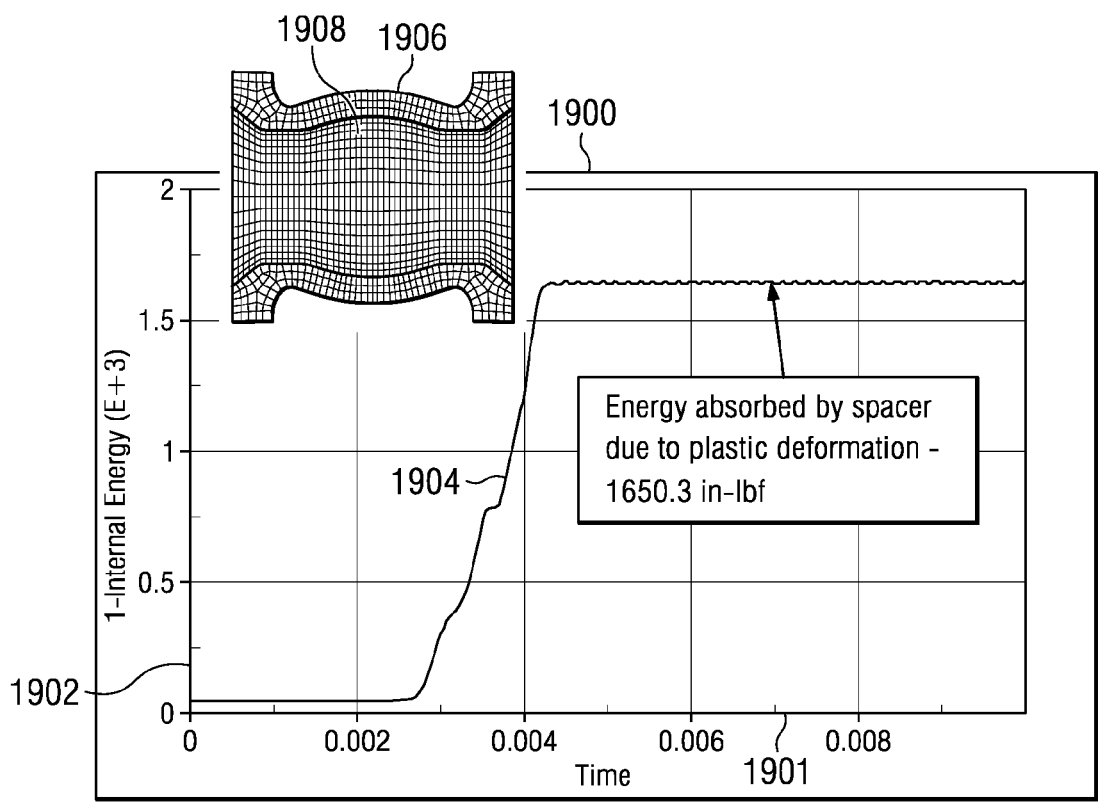
FIG. 19 is a diagram illustrating energy absorption by a spacer caused by plastic deformation in accordance with an advantageous embodiment.

With reference now to FIG. 19, a diagram illustrating energy absorption by a spacer caused by plastic deformation is depicted in accordance with an advantageous embodiment. Graph 1900 illustrates energy absorption by a baseline spacer that may be used in designing a crushable spacer. A baseline spacer may be a crushable spacer that has no stiffeners in these examples.

In this illustration, x-axis 1901 represents time, while y-axis 1902 represents energy absorption. Line 1904 represents energy absorption by baseline spacer 1906, which is shown in a deformed shape. As can be seen in this example, baseline spacer 1906 displays a single plastic hinge, hinge 1908, and may absorb energy due to plastic deformation of around 1650.3 in-lbf.

Figure 20:
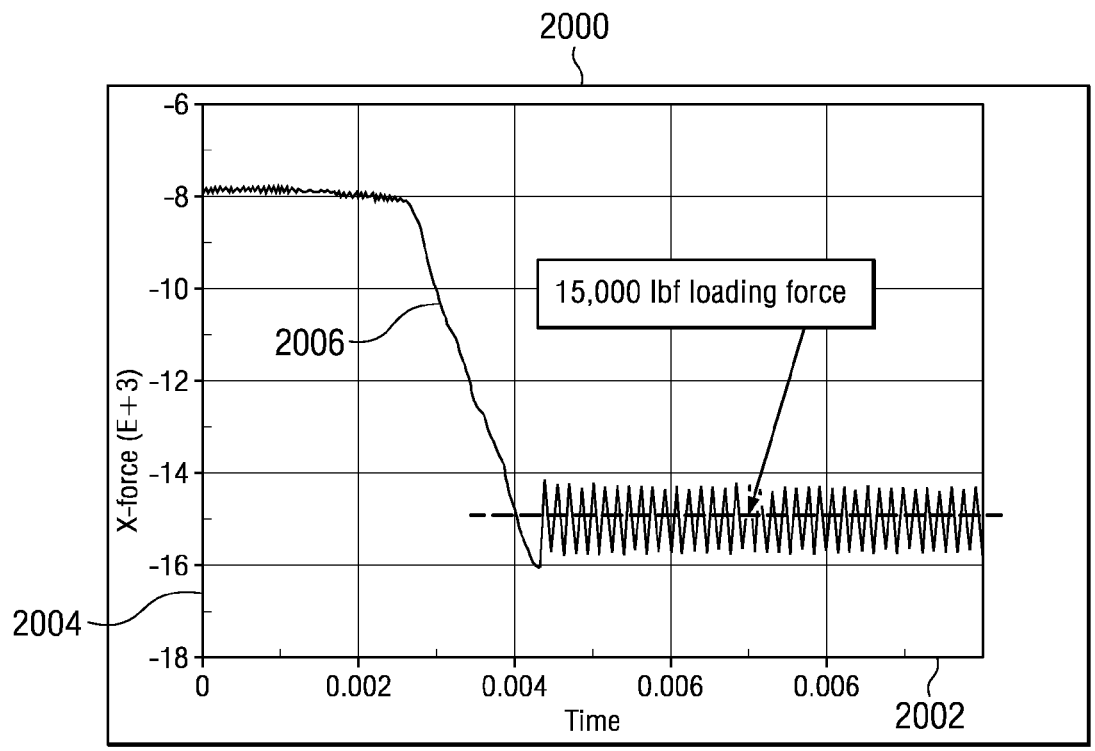
FIG. 20 is a diagram illustrating energy absorption by a spacer caused by plastic deformation in accordance with an advantageous embodiment.

With reference now to FIG. 20, a diagram illustrating a loading force is depicted in accordance with an advantageous embodiment. In this example, graph 2000 illustrates a loading force that is applied for testing of crushable spacers. X-axis 2002 represents time, while y-axis 2004 represents loading force in pounds or lbs. Line 2006 represents the loading force applied to different crushable spacers in accordance with an advantageous embodiment. The loading force illustrated by line 2006 in graph 2000 is an example of force applied to baseline spacer 1906 in the simulation for energy absorption to generate line 1904 for graph 1900 in FIG. 19.

Figure 21:
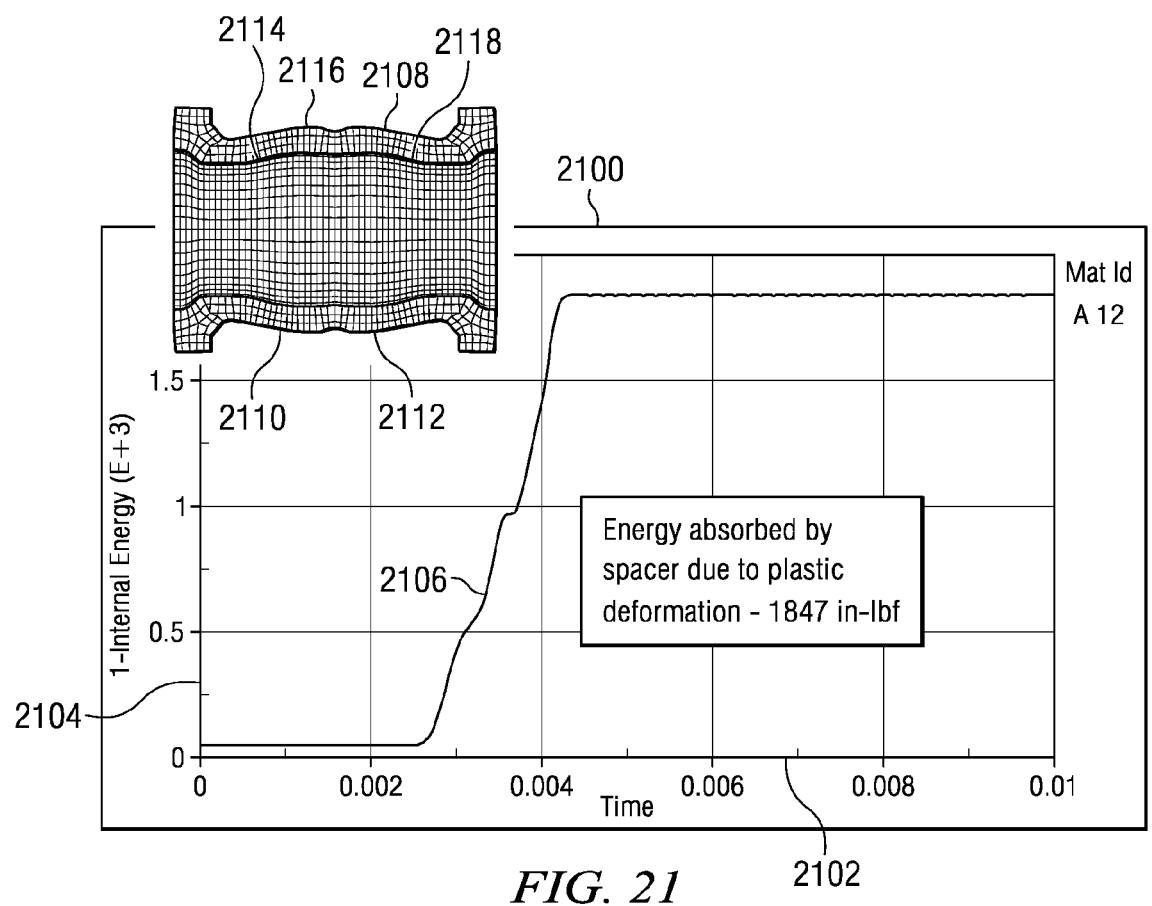
FIG. 21 is a diagram illustrating energy absorption by a crushable spacer with stiffeners in accordance with an advantageous embodiment.

With reference now to FIG. 21, a diagram illustrating energy absorption by a crushable spacer with stiffeners is depicted in accordance with an advantageous embodiment. In this example, graph 2100 represents energy absorbed by a spacer due to plastic deformation. X-axis 2102 represents time, while y-axis 2104 represents energy. Line 2106 represents energy absorbed by spacer 2108, which is shown in a deformed shape. Line 2106 is generated using the force as illustrated by line 2006 in FIG. 20.

As can be seen in this example, the energy absorbed by spacer 2108 is around 1847 in-lbf. This energy absorption is greater than spacer 1906 in FIG. 19. As can be seen in this example, spacer 2108 has stiffeners 2110 and 2112, which result in hinges 2114, 2116, and 2118 occurring during deformation of crushable spacer 2108. As can be seen by comparing the results in graph 2100 with graph 1900, around 12 percent more energy is absorbed by crushable spacer 2108 as compared to crushable spacer 1906. This increased energy absorption results in around 6.2 less stress on a bolt. As a result, this type of spacer may increase the bolt margin to failure by around 6.2 percent.

Thus, the different advantageous embodiments provide a method and apparatus for securing parts to each other. A tubular body with a channel and a number of stiffeners form a crushable spacer. The tubular body is capable of being compressed in an axial direction. The number of stiffeners is located in a number of locations for the tubular body.

With the use of this type of crushable spacer, increased numbers of hinges may be present during compression of the tubular body in the axial direction. These hinges may increase the number of deformable regions in a manner that increases energy absorption as compared to crushable spacers with less numbers of hinges.

With one or more of the advantageous embodiments, a bolt may be selected that has a lighter weight and/or lower cost material that is capable of withstanding forces applied to a first and second part when installed in conjunction with a crushable spacer. This crushable spacer absorbs some of the energy that would otherwise be applied to the bolt. Further, the design of the parts, such as flanges on the parts, may be made in a manner that reduces weight and/or expense with crushable spacers in accordance with different advantageous embodiments.

Thus, the weight and/or expense for manufacturing objects may be reduced using crushable spacers in accordance with different advantageous embodiments.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

Although the different advantageous embodiments have been described with respect to aircraft, other advantageous embodiments may be applied to other types of objects. For example, without limitation, other advantageous embodiments may be applied to a mobile platform, a stationary platform, a land-based structure, an aquatic-based structure, a space-based structure, and/or some other suitable object.

More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a tubular body with a channel, wherein the tubular body is capable of being compressed in an axial direction;
    a first end portion of the tubular body;
    a second end portion of the tubular body;
    a first tapered section of the tubular body, proximate the first end portion, wherein the first tapered section is characterized by a first diameter tapering to a second diameter;
    a second tapered section of the tubular body, proximate the second end portion, wherein the second tapered section is characterized by a first diameter tapering to a second diameter;
    a number of stiffeners, each stiffener comprising a substantially circular ridge having a diameter that is greater than a diameter of the tubular body and being located at spaced apart locations on the tubular body;
    a first flange on the tubular body located at the first end portion of the tubular body and a second flange on the tubular body located at the second end portion of the tubular body, wherein the first and second flanges have a diameter larger than a diameter of the number of stiffeners; and
    a plurality of hinges configured to absorb energy, said hinges located between the spaced apart locations of the number of stiffeners for the tubular body and between each of the plurality of flanges and an adjacent one of the number of stiffeners, wherein said hinges located between the spaced apart locations of the number of stiffeners are configured to expand away from the channel while said hinges between each of the plurality of flanges and an adjacent one of the number of stiffeners thereto contract inwardly into the channel in response to the tubular body being compressed in the axial direction.

2. The apparatus of claim 1, wherein at least one of the number of stiffeners is located on a surface selected from one of an outer surface of the tubular body and an inner surface of the tubular body.

3. The apparatus of claim 1, wherein the tubular body has a curved surface on each side of each of the number of stiffeners.

4. The apparatus of claim 1, wherein the number of stiffeners is selected from at least one of a shape extending from a surface of the tubular body and a different material from other portions of the tubular body in which the number of stiffeners is absent.

5. The apparatus of claim 1, wherein the tubular body and the number of stiffeners form a crushable spacer and further comprising:
    a structure, wherein the crushable spacer is capable of absorbing an amount of energy caused by a movement of a first part in a plurality of parts relative to a number of other parts in the plurality of parts in the structure.

6. The apparatus of claim 5, wherein the crushable spacer is capable of reducing energy applied to a fastener associated with the crushable spacer in response to the movement of the first part in the plurality of parts relative to the number of other parts in the plurality of parts.

7. The apparatus of claim 6, wherein the plurality of parts has collinear holes, and further comprising:
    a bolt, wherein the bolt passes through the collinear holes and the crushable spacer; and
    a nut, wherein the nut secures the bolt that passes through the collinear holes.

8. The apparatus of claim 7, wherein the crushable spacer is located adjacent to a head of the bolt.

9. The apparatus of claim 7, wherein a first part in the plurality of parts is an inlet and a second part in the plurality of parts is an engine case.

10. The apparatus of claim 9, wherein a first hole in the collinear holes is located in a flange for the inlet, and a second hole in the collinear holes is located in a flange for the engine case.

11. The apparatus of claim 5, wherein the structure is selected from one of a mobile platform, a stationary platform, a land-based structure, an aquatic-based structure, a space-based structure, an aircraft, a surface ship, a tank, a personnel carrier, a train, a spacecraft, a space station, a satellite, a submarine, an automobile, a power plant, a bridge, a dam, a manufacturing facility, and a building.

12. The apparatus of claim 5, wherein the diameter of the plurality of flanges is larger than a diameter of the first part.

13. The apparatus of claim 1 wherein at least one hinge comprises a plastic hinge.

14. The apparatus of claim 1 wherein the tubular body defines an inner surface and an outer surface, and the number of stiffeners are disposed on the outer surface.

15. A compressible apparatus for absorbing energy comprising:
    a tubular body with a channel, wherein the tubular body is capable of being compressed in an axial direction;
    a plurality of stiffeners located on an outer surface of the tubular body, each stiffener comprising a ridge extending from the tubular body, and each stiffener characterized by a diameter that is greater than a diameter of the tubular body;
    a first flange positioned at a first end of the tubular body;
    a second flange positioned at a second end of the tubular body, wherein the first flange and the second flanges have a diameter larger than the diameter of the each of the plurality of stiffeners; and
    the tubular body comprising a plurality of hinges configured to absorb energy, at least one first hinge positioned between a pair of stiffeners, a second hinge positioned between the first flange and an adjacent stiffener thereto, and a third hinge positioned between the second flange and an adjacent stiffener thereto, wherein said at least one first hinge is configured to expand away from the channel while said second and third hinges are configured to contract inwardly into the channel; in response to the tubular body being compressed in the axial direction.

* * * * *